F. H. Smith,
Column.

No. 96,357.  Patented Nov. 2, 1869.

Frederick H. Smith
by his attorney
A. Pollok

Witnesses

United States Patent Office.

FREDERICK H. SMITH, OF BALTIMORE, MARYLAND.

Letters Patent No. 96,357, dated November 2, 1869.

---

IMPROVED COLUMN OR TUBE.

---

The Schedule referred to in these Letters Patent and making part of the same.

---

*To whom it may concern:*

Be it known that I, FREDERICK H. SMITH, of Baltimore, in the county of Baltimore, and State of Maryland, have invented certain new and useful Improvements in the Manufacture of Columns or Tubes, for engineering and other purposes; and I hereby declare the following to be a full, clear, and exact description of the same, reference being had to the accompanying drawings.

My invention consists of a column or tube composed of two or more concentric layers of wrought-iron, steel, or other suitable metal, united by riveting, brazing, welding, or other means, the segments of the one layer breaking joint with the segments of the other.

The nature of my invention will be readily understood by reference to the drawings, in which—

Figure 1:
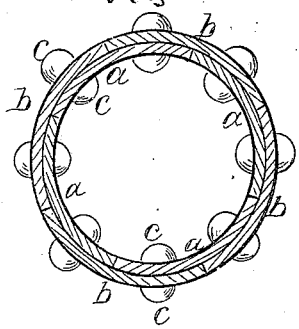

Figure 1 is a transverse section, and

Figure 2:
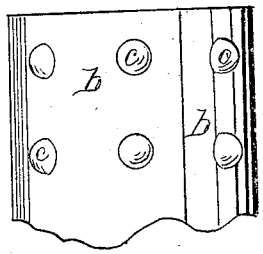

Figure 2, a side elevation of a tube or column made in accordance with my invention.

Figure 3:
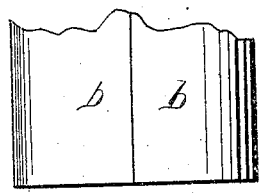
Figure 4:
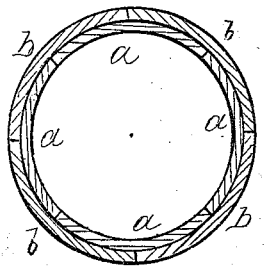

Figures 3 and 4 are like views of a column, of modified construction.

Figure 5:
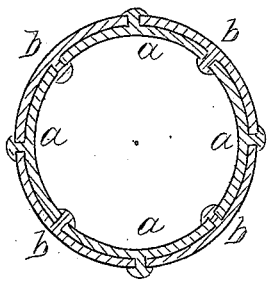
Figure 6:
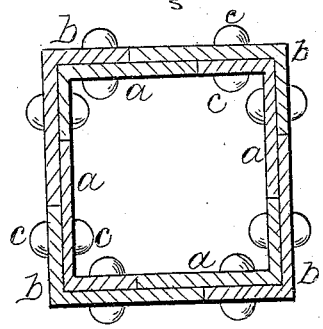
Figure 7:
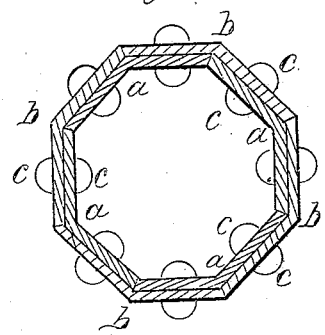

Figures 5, 6, and 7, are transverse sections of other columns or tubes of modified form.

In figs. 1 and 2 is represented a column composed of two concentric layers of metallic segments, riveted together from the inside to the outside of the column.

Each layer is composed, in this instance, of four segments, the inner designated by the letters *a*, and the outer by the letters *b*, while the rivets by which the two are united are shown at *c*.

Instead of employing four segments, I can, however, use two, three, or more segments in each layer, depending upon the size required for the column, and the use to which it is to be put.

The inner segments are placed so as to break joint with the outer segments, and after the buts of the plates in each layer have been put together, the rivets are inserted and upset, so as to bind all the plates together into a solid and compact column.

The process of manufacture will be readily understood.

The plates, in order to be shaped, require no special machinery, but can be rolled, or otherwise brought to the proper shape by any ordinary or suitable means. They can then be placed upon a mandrel or former, of the proper form, the plates of the inner layer first, and afterward the plates of the outer layer, and after being clamped in position, the rivets can be inserted in the holes punched for them, and then the heated ends upset upon the inside of the column, by means of movable dies or moulds located in the mandrel or former, as described in another application for Letters Patent of the United States made by me, and now pending. Or the rivets or bolts may be attached by other suitable means.

Figs. 3 and 4 represent a column or tube in which the concentric layers of segments *a b* are united, not by rivets, but by brazing, welding, soldering, or other like means.

In the sections of columns, represented in figs. 6 and 7, the riveting is the same as that shown in fig. 1, but the columns themselves are of different shape, the section of the one being rectangular, and that of the other polygonal. The two layers of each column, however, are composed of the required number of segments to complete the section, and they break joint with one another, as above described.

In fig. 5, each segment of the two layers has formed upon it a series of pins or rivets, extending midway between its sides. The pins *d*, of the outer segments, project inward, and the pins *e*, of the inner segments, project outward, the former pins being so located as to pass through the joints of the outer segments, and the latter pins to pass through the joints of the inner segments.

This is fully indicated in the figure, and requires no further explanation. The rivet-heads are formed or upset as above described, or in any other suitable manner.

The foregoing is sufficient to illustrate the nature of my invention. I desire, however, again to say, that the union of the layers of segments which compose the column or tube may be effected in the manner herein described, or by other means. Soldering might be effective in some instances, while the brazing and welding-processes may also be employed. I have also contemplated depositing the agent for uniting the layers by means of electricity. The joints themselves of the segments may be united by welding or other means, if desired.

I contemplate using the tubes and columns of this construction in any of the connections in which other tubes and columns are now used. They can be employed to advantage in engineering, as, for instance, to form piers or trestles for bridges, for boiler-tubes, pipes, &c., ships' masts, and for any other purpose where a strong, durable, and cheap tube or column is required.

The thickness of the plates will vary with the uses to which the column is to be put.

They can be rolled with great ease into any of the forms of section required, without the use of special machinery, and their manufacture is attended with not more, and perhaps less expense than that of ordinary columns, while they are far stronger, and more durable.

I am aware that shot-towers and other structures, such as light-houses, have been built of strips of wood or metal overlaid so as to break joint; and I am also aware that earthenware pipes, for sewage-purposes, have been of two or more layers of segments breaking joint; but such structures or devices are not contemplated under my invention, which is directed to the production of metallic columns or tubes for bridge-structures, or other purposes as herein specified.

Having now described my invention, and the manner in which the same is or may be carried into effect,

What I claim, and desire to secure by Letters Patent, is—

A column or tube, for engineering and other purposes, composed of two or more concentric layers of wrought-iron, steel, or other metallic segments, united substantially as described, and arranged so that the segments of one layer shall break joint with those of the other.

In testimony whereof, I have signed my name to this specification, before two subscribing witnesses.

FREDERICK H. SMITH.

Witnesses:
   EDM. F. BROWN,
   M. BAILEY.